United States Patent [19]

Kawabe

[11] Patent Number: 5,295,640
[45] Date of Patent: Mar. 22, 1994

[54] SPINNING REEL WHICH PREVENTS INADVERTENT BAIL CLOSING DURING CASTING

[75] Inventor: Yuzo Kawabe, Izumi, Japan

[73] Assignee: Shimano Inc., Osaka, Japan

[21] Appl. No.: 786,069

[22] Filed: Oct. 31, 1991

[30] Foreign Application Priority Data

Nov. 7, 1990 [JP] Japan .................... 2-116792[U]

[51] Int. Cl.$^5$ .................................................. A01K 89/01
[52] U.S. Cl. .................................. 242/248; 242/284
[58] Field of Search ............ 242/232, 233, 247, 248, 242/284

[56] References Cited

U.S. PATENT DOCUMENTS

| | | | |
|---|---|---|---|
| 4,193,562 | 3/1980 | Gifford | 242/248 |
| 4,238,085 | 12/1980 | Jansson | 242/232 X |
| 4,403,750 | 9/1983 | Morimoro | 242/232 |
| 4,848,695 | 7/1989 | Kaneko | 242/232 |
| 4,881,699 | 11/1989 | Emura | 242/248 |

FOREIGN PATENT DOCUMENTS 62-80570  5/1987  Japan.

Primary Examiner—Daniel P. Stodola
Assistant Examiner—Eileen Dunn
Attorney, Agent, or Firm—Dickstein, Shapiro & Morin

[57] ABSTRACT

A spinning reel includes a reversing mechanism and a one way clutch. The one-way clutch includes a ratchet wheel defining a plurality of teeth, and a ratchet pawl. The one-way clutch, an engaging section of a reel body and the reversing mechanism are in such a positional relationship that the reversing mechanism contacts or lies close to the engaging sections when a rotor is stopped by the one-way clutch.

5 Claims, 3 Drawing Sheets

SPINNING REEL WHICH PREVENTS INADVERTENT BAIL CLOSING DURING CASTING

BACKGROUND OF THE INVENTION

1. Field of the Invention

This invention relates to a spinning reel, and more particularly to a spinning reel having a bail arm connected to a rotor supported by a reel body to be freely rotatable, the ball arm being switchable between and retainable in a takeup position and a release position by an urging force of a toggle mechanism, a reversing mechanism for contacting an engaging section of the reel body when the rotor is rotated in a line winding direction with the bail arm set to the release position, to switch the bail arm to the takeup position against the urging force of the toggle mechanism, and a one-way clutch for allowing rotation of the rotor only in the line winding direction.

2. Description of the Related Art

A known spinning reel having a reversing mechanism as noted above is disclosed in Japanese Utility Model Publication Kokai No. 62-80570, for example. In this prior construction, the toggle mechanism includes a compression spring mounted in an oscillatable case. When the rotor is rotated in a line winding direction with the bail arm set to the release position, an operating force is transmitted from an oscillatable piece contacting an engaging section projecting from the reel body, to the case of the toggle mechanism, whereby the case reaches a position beyond a dead point.

When the angler swings a fishing rod at high speed for throwing a bait far, for example, a strong force may act on a handle of the reel having the reversing mechanism, to turn the handle and the rotor in the line winding direction. As a result, the bail arm may be switched to the takeup position by the reversing mechanism. This switching operation is effected against the urging force of the toggle mechanism, and thus takes place in a situation where the rotor rotates in excess of a certain angle to produce a relatively strong dynamic inertia. When such a switching operation is carried out in a natural way at a bait casting time, the fishing line is stopped being unwound from the spool, which results in breaking of the fishing line or a reduced bait casting distance. Thus, there is room for improvement.

SUMMARY OF THE INVENTION

The object of the present invention is to provide an improved spinning reel which checks switching of a bail arm to a takeup position even if a handle is in a position to be turned readily at a bait casting time.

The above object is fulfilled, according to the present invention, by a spinning reel having a reversing mechanism and other components as noted in the introductory part hereof, wherein the one-way clutch includes a ratchet wheel defining a plurality of teeth, and a ratchet pawl; and the one-way clutch, the engaging section and the reversing mechanism are in such a positional relationship that the reversing mechanism contacts or lies close to the engaging section when the rotor is stopped by the one-way clutch.

This construction has the following functions and effects.

The present invention may be embodied as shown in FIGS. 1 through 4. When throwing a bait, the rotor 4 is rotated backward to a phase of rotation to be stopped by the one-way clutch C. Thereafter, the bail arm 3 is set to the release position B. The rotor 4 is then prevented from rotating backward by the one-way clutch C as shown in FIG. 1. At the same time, the reversing mechanism R contacts or lies close to the engaging section 24, which locks the rotor 4 with little play in either direction of rotation. In this state, the rotor 4 is free from a great dynamic inertia even if the handle 1 is in a position readily rotatable in the line winding direction at a bait casting time.

Further, according to the present invention, the reversing mechanism R may be set to a position for contacting or close to the engaging section 24 in relation to a plurality of phases of rotation in which the rotor 4 is prevented from rotating backward by the one-way clutch C. Thus, the rotor 4 may be locked promptly regardless of the phase of rotation of the rotor 4.

The rotor is readily lockable at a fishing time regardless of the phase of rotation of the rotor. The present invention thus provides an improved spinning reel which checks switching of the bail arm to the takeup position even if the handle is in a position to be turned readily at a bait casting time.

Other features and advantages of the present invention will be apparent from the following description.

BRIEF DESCRIPTION OF THE DRAWINGS

The drawings show a spinning reel according to the present invention, in which.

DETAILED DESCRIPTION OF THE PREFERRED EMBODIMENTS

A spinning reel according to the present invention will be described in detail with reference to the drawings.

Figure 4:
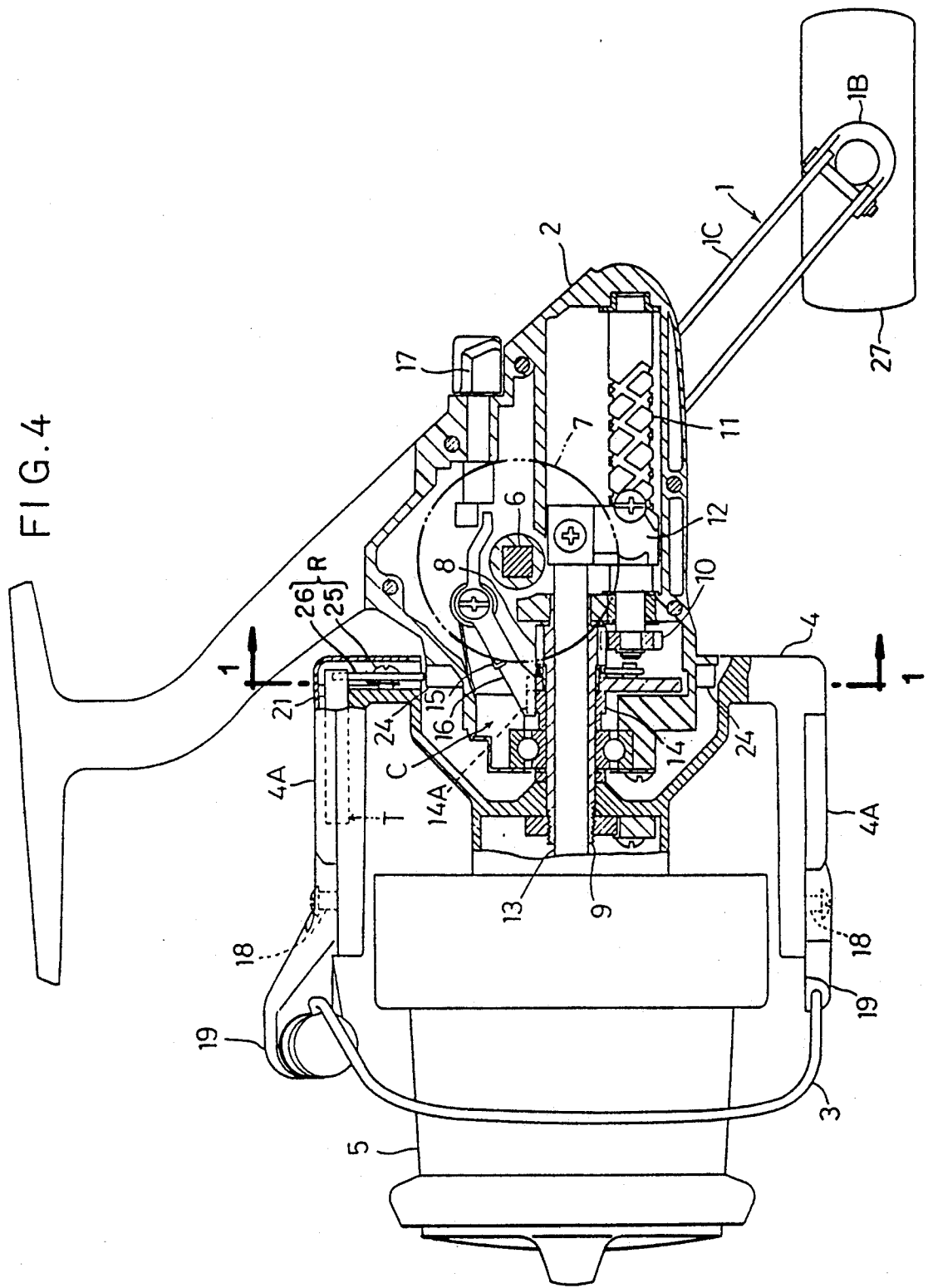
FIG. 4 is a side view partly in section of the spinning reel.

As shown in FIG. 4, this spinning reel has a handle 1 connected to a reel body 2. The reel body 2 includes, in forward positions thereof, a rotor 4 carrying a bail arm 3, and a spool 5. The reel body 2 further includes a winding transmission system for transmitting torque from a handle shaft 6 to the rotor 4 through a drive gear 7, a pinion gear 8 and a sleeve shaft 9, and an oscillating mechanism for transmitting drive from the pinion gear 8 to a spool shaft 13 as converted to a reciprocating motion through an input gear 10, a screw shaft 11 and a slider 12.

Figure 1:
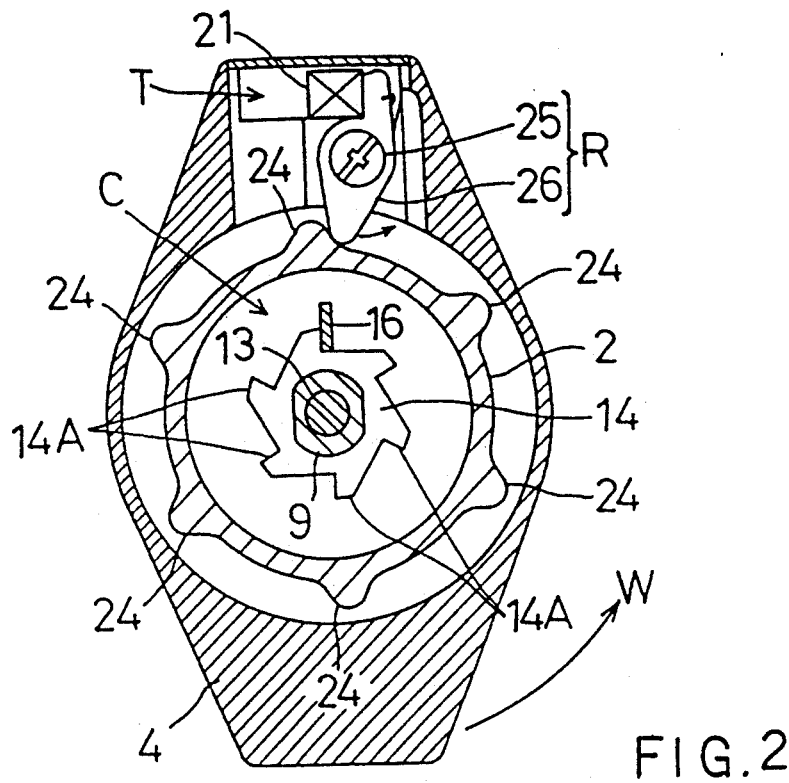
FIG. 1 is a rear view in vertical section showing a ratchet wheel and adjacent components.

As shown in FIGS. 1 and 4, this reel has a one-way clutch C for preventing backward rotation (in a direction to unwind a fishing line) of the rotor 4. The one-way clutch C includes a ratchet wheel 14 defining a plurality of teeth 14A, and a ratchet pawl 16 urged by a spring 15 to a position to engage the ratchet wheel 14. The one-way clutch C is operable by a control lever 17 mounted on the reel body 2, to allow backward rotation of the rotor 4.

Figure 2:
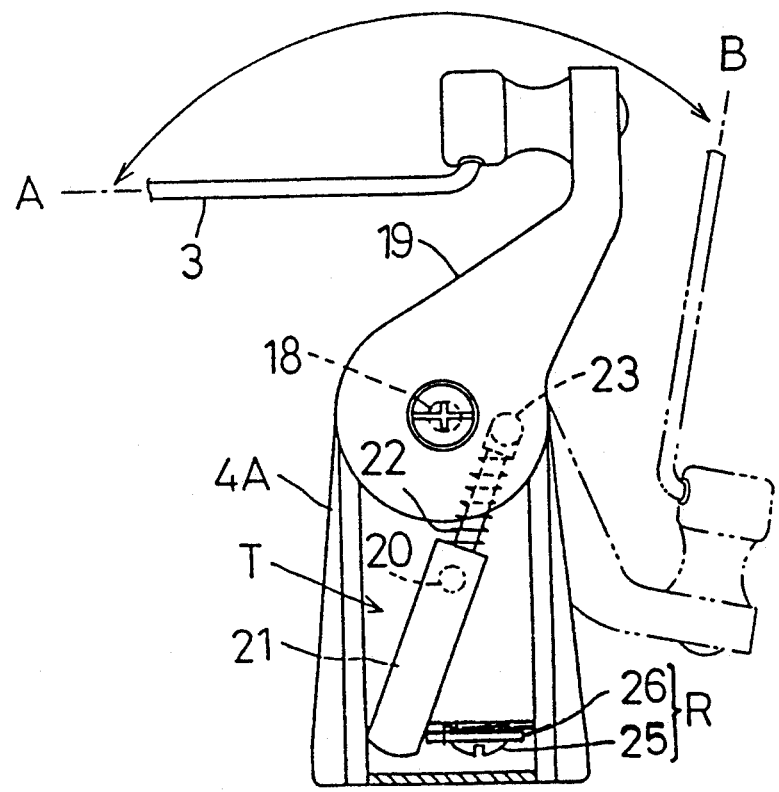
FIG. 2 is a view showing a toggle mechanism and adjacent components.

As shown in FIGS. 2 and 4, the bail arm 3 is connected to oscillating arms 19 supported to be oscillatable on a support axis 18 by a pair of arms 4A of the rotor 4. Thus, the bail arm 3 is switchable between a takeup position A and a release position B. One of the arms 4A contains a toggle mechanism T for maintaining the bail arm 3 in the takeup position A or release position B.

The toggle mechanism T includes a pin 23 connected to the arm 19 and urged by a compression coil spring 22 to project relative to a case 21 oscillatably supported on an axis 20.

The reel body 2 further includes a plurality of engaging projections 24 corresponding to the plurality of teeth 14A for preventing backward rotation of the rotor when the rotor 4 is rotated in a line winding direction W with the bail arm 3 set to the release position B. These projections 24 are contactable by a reversing mechanism R for switching the bail arm 3 to the takeup position A against the urging force of the toggle mechanism T. The reversing mechanism R includes an oscillating piece 26 supported by a screw 25. The oscillating piece 26 is operable through contact with the projections 24 to oscillate the oscillatable case 21 of the toggle mechanism T.

This reel is devised to prevent the bail arm 3 from being switched by the reversing mechanism R when a force is applied at a bait casting time to turn the handle 1 in the line winding direction. For this purpose, as shown in FIG. 1, the projections 24 and reversing mechanism R are arranged in such a positional relationship that the reversing mechanism R contacts or lies close to the projections 24 when the rotor 4 is stopped by the one-way clutch C. Thus, when the bail arm 3 is set to the reversing mechanism R, rotation in either direction is locked with little play.

Figure 3:
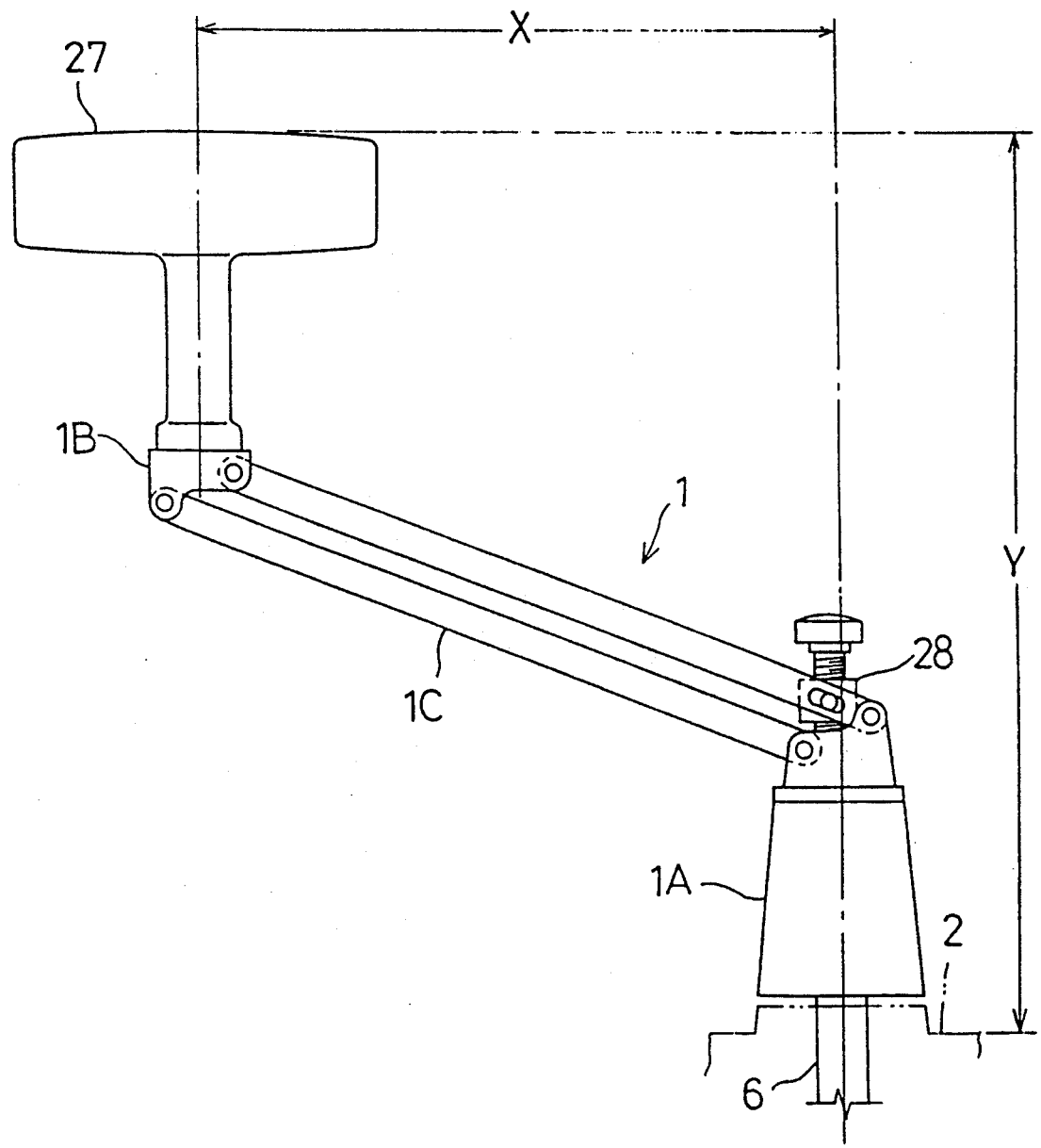
FIG. 3 is a view showing a construction of a handle.

As shown in FIG. 3, the handle 1 includes a portion 1A connected to the handle shaft 6, a portion 1B having a grip 27, and a parallelogram link mechanism 1C interconnecting the two portions 1A and 1B. The handle 1 further includes a screw type adjuster 28 for adjusting an arm length X and an extent of projection Y from the reel body 2.

Apart from the foregoing embodiment, the present invention may be worked in various other forms. For example, the reversing mechanism R may be modified to apply an operating force directly to the oscillating arm instead of transmitting the force through the toggle mechanism T.

What is claimed is:

1. A spinning reel comprising:
   a reel body;
   a rotor for winding a fishing line on a spool mounted on a spool shaft;
   a bail arm pivotably supported on said rotor, said bail arm having a take-up position to take-up the fishing line and a release position to release fishing line, said bail arm being urged by a toggle mechanism provided on said rotor either toward said take-up position or toward said release position;
   a bail mounted on said bail arm;
   a control piece provided on said rotor, said control piece being pivotable between a first position and a second position, said control piece contacting said toggle mechanism to switch said bail arm when in said release position to said take-up position when said control piece pivots from said first position to said second position;
   a plurality of operating portions provided on said reel body, said plurality of operating portions contacting said control piece to switch said control piece, when in said first position into said second position in association with a rotation of said rotor in a line winding direction;
   an anti-reversing mechanism disposed between said reel body and said rotor, said anti-reversing mechanism including a ratchet wheel mounted on said spool shaft, said ratchet wheel having a plurality of engaging teeth, said ratchet wheel being non-rotatable relative to said rotor, and a ratchet pawl supported on said reel body, said ratchet pawl being pivotable to engage with one of said engaging teeth of said ratchet wheel, said anti-reversing mechanism being arranged such that said ratchet pawl prevents said ratchet wheel from rotating in a line releasing direction, and thereby prevents said rotor from rotating in said line winding releasing direction, when said ratchet pawl is engaged with said one of said engaging teeth of said ratchet wheel;
   wherein the portion of said teeth of said ratchet wheel relative to rotational position of said rotor is determined so that said ratchet pawl substantially simultaneously contacts a tooth of said ratchet wheel when said control piece is contacted by one of said operating portions.

2. A spinning reel defined in claim 1 wherein said plurality of operating portions and said plurality of engaging teeth of said ratchet wheel are equal in number.

3. A spinning reel as claimed in claim 1, wherein said bail arm is connected to respective support arms pivotably supported on a support axis by a pair of arms of said rotor, one of said support arms containing said toggle mechanism.

4. A spinning reel as claimed in claim 1, wherein said toggle mechanism includes a pin connected to said one support arm, said pin being urged by a compression coil spring to urge said bail arm toward said take-up position or toward said release position.

5. A spinning reel as claimed in claim 4, wherein said control piece is pivotably supported by a screw, said control piece being operable through contact with said operating portions to switch into said second position upon a rotation of said rotor in a line winding direction.

* * * * *